United States Patent
Sung

(10) Patent No.: US 8,671,638 B2
(45) Date of Patent: Mar. 18, 2014

(54) FRAME STRUCTURE FOR SOLAR CELL MODULE

(75) Inventor: Shen-Shiou Sung, Miaoli County (TW)

(73) Assignee: Hulk Energy Technology Co., Ltd., Miaoli County (TW)

( * ) Notice: Subject to any disclaimer, the term of this patent is extended or adjusted under 35 U.S.C. 154(b) by 327 days.

(21) Appl. No.: 13/307,117

(22) Filed: Nov. 30, 2011

(65) Prior Publication Data

US 2013/0087519 A1 Apr. 11, 2013

(30) Foreign Application Priority Data

Oct. 7, 2011 (TW) .............................. 100218891 U

(51) Int. Cl.
*E04C 2/38* (2006.01)

(52) U.S. Cl.
CPC ....................................... *E04C 2/38* (2013.01)
USPC ........................................... 52/475.1; 52/780

(58) Field of Classification Search
CPC ........... E04C 2/28; E04C 2/388; E04C 2/384; A47G 1/06; A47G 1/0605; A47G 1/0611; A47G 1/0633
USPC ................ 52/475.1, 482, 766, 773, 775, 780, 52/781.3, 800.12, 204.64, 204.69, 204.7; 40/768, 777, 790
See application file for complete search history.

(56) References Cited

U.S. PATENT DOCUMENTS

| | | | | | |
|---|---|---|---|---|---|
| D253,131 | S | * | 10/1979 | Broadbent | .................... D25/125 |
| 4,839,974 | A | * | 6/1989 | Walter | ............................. 40/784 |
| 4,877,213 | A | * | 10/1989 | Lambert | ........................ 248/451 |
| 5,515,629 | A | * | 5/1996 | Johansson | ........................ 40/745 |
| 8,505,224 | B2 | * | 8/2013 | Huang | ............................. 40/790 |
| 2010/0263724 | A1 | | 10/2010 | Tazawa et al. | |

* cited by examiner

*Primary Examiner* — Michael Safavi
(74) *Attorney, Agent, or Firm* — WPAT, PC; Justin King

(57) ABSTRACT

A frame structure for solar cell module is disclosed, which has four sidebars and each sidebar is comprised of a bottom, a first vertical wall, a second vertical wall, a first horizontal wall and a second horizontal wall in a manner that the first vertical wall is formed with a width larger than the second vertical wall; the second vertical wall is connected to the bottom and spaced from the first vertical wall by a first distance; the second horizontal wall is connected to the first vertical wall by an end away from the bottom; the first horizontal wall is connected to the first vertical wall and is spaced from the second horizontal wall by a second distance; the second horizontal is formed with a thin panel at a side that is proximate to the first horizontal wall for blocking the overflow of a filling material in the frame structure.

5 Claims, 8 Drawing Sheets

FRAME STRUCTURE FOR SOLAR CELL MODULE

FIELD OF THE INVENTION

The present invention relates to solar cell technology, and more particularly, to a frame for solar cell module.

BACKGROUND OF THE INVENTION

For a conventional solar cell module based on copper indium selenide (CIS), it is basically formed as a solar cell that is made by depositing a metallic back layer, a p-type absorber layer, a high-resistance buffer layer and a n-type window layer on a substrate. Moreover, after being sandwiched inside a weather-resistance film made of a filling material, such as ethylene vinyl acetate (EVA), the so-constructed solar cell is further being covered by a compactly fitted inside a glass housing while being framed by a frame structure that can be made of aluminum. Thereby, the solar cell module that is being framed inside the frame structure is capable of preventing the incursion of water and moisture into the glass housing and thus improving the weather resistance of the solar cell module.

Generally, while viewing a conventional CIS-based solar cell module, which is formed as a solar cell element sandwiched between a glass cover and a glass substrate and framed inside an aluminum frame structure while having an electrode assembly protruding outside the frame structure, only the aluminum frame structure, the electrode assembly and the solar cell element is clearly visible. In addition, in some cases, the aluminum frame structure is coated in a color the same as that of the solar cell element.

It is noted that there will be filling materials being filled into the aluminum frame structure before integrating the aluminum frame structure with the solar cell element, and thus, while fitting the solar cell element into the aluminum frame structure, the filling materials will be squeezed and thus overflowed out of the frame structure and onto the front and back of the solar cell element. Therefore, it is necessary to include an additional machining process into the manufacturing of the solar cell module for removing the filling material that is overflowed on the front of the solar cell element so as to ensure the solar cell module to operate normally.

There are already many studies for preventing the filling materials from overflowing. One of which is solar cell module disclosed in U.S. Pat. App. No. 2010/0263724A1, in which a structure composed of a spacer, a projected line and a guide groove is used for preventing the filling material to overflow on the front side of the solar cell element, but instead to be guided to flow into the guide groove.

Nevertheless, despite that the filling materials can be guided and thus prevented from flowing on the front of the solar cell element by the aforesaid technique, the overall labor and cost for manufacturing the solar cell module will be increased, since not only an additional machining process is required for processing the aluminum frame so as to formed the projected line and the guide groove, but also there is additional materials required for forming the spacers.

SUMMARY OF THE INVENTION

The primary object of the present invention is to provide a frame structure capable of preventing any filling material from overflowing on the front side of a solar cell element during the integration of the solar cell element and the front structure, without having the so-constructed solar cell module to be processed by an additional machining process for processing the overflowed filling material after the integration, and thus reducing the manufacturing time required for the consequent solar cell module.

To achieve the above object, the present invention provides a frame structure for solar cell module, which comprises: four sidebars and four corner connectors in a manner that any two neighboring sidebars are connected by one corner connector selected from the four corner connectors, while characterized in that each of the four sidebars is comprised of a bottom, a first vertical wall, a second vertical wall, a first horizontal wall and a second horizontal wall in a manner that the first vertical wall is formed with a width larger that that of the second vertical wall, and the first vertical wall is connected to an end of the bottom by an end thereof while being arranged perpendicular to the bottom; the second vertical wall is connected to the bottom and is arranged perpendicular to the bottom while allowing the second vertical wall to be spaced from the first vertical wall by a specific first distance; the second horizontal wall is connected to an end of the first vertical wall that is disposed away from the bottom while being arranged perpendicular to the first vertical wall; the first horizontal wall is perpendicularly connected to the first vertical wall and is spaced from the second horizontal wall by a specific second distance while being arranged abutting against an end of the second vertical wall that is disposed away from the bottom; the second horizontal wall is formed with a thin panel at a side thereof that is proximate to the first horizontal wall while allowing the thin panel to extend toward the first horizontal wall, and to be formed with a height smaller than the specific second distance; the thin panel is arranged spacing from the first vertical wall by a specific third distance while enabling the specific third distance to be smaller than the specific first distance.

In an embodiment, the thin panel is designed to sway in a direction toward or away from the first vertical wall by an angle not larger than 60 degrees before it is bended or snapped.

In another embodiment, the thin panel is formed with a groove at a side thereof that is disposed away from the first vertical wall, or on both sides of the thin panel, that one is arranged neighboring to the first vertical wall while another is arranged away from the same, are each formed with at least one groove.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
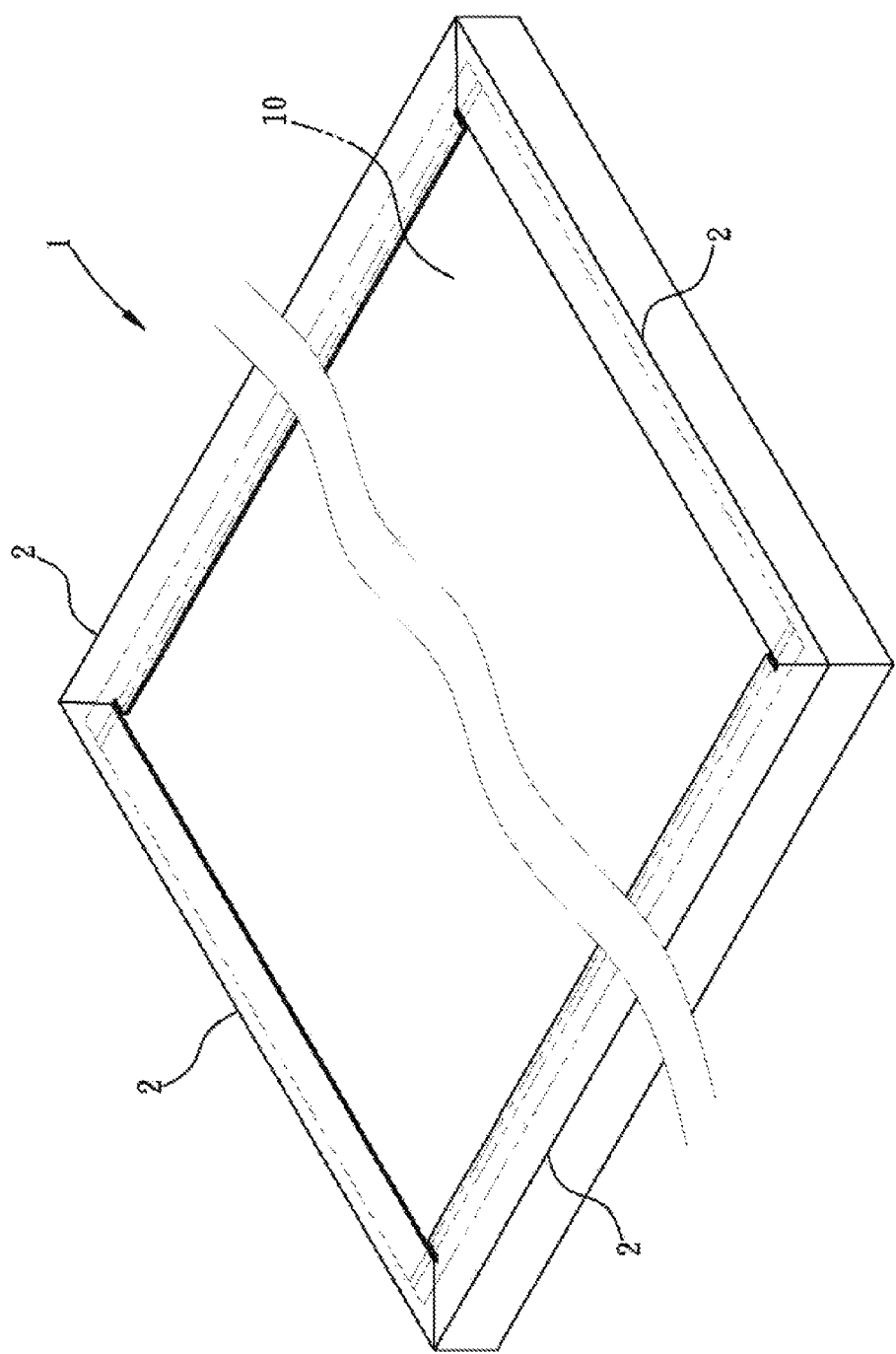
FIG. 1 is a schematic diagram showing a frame structure for solar cell module according to the present invention.
Figure 2:
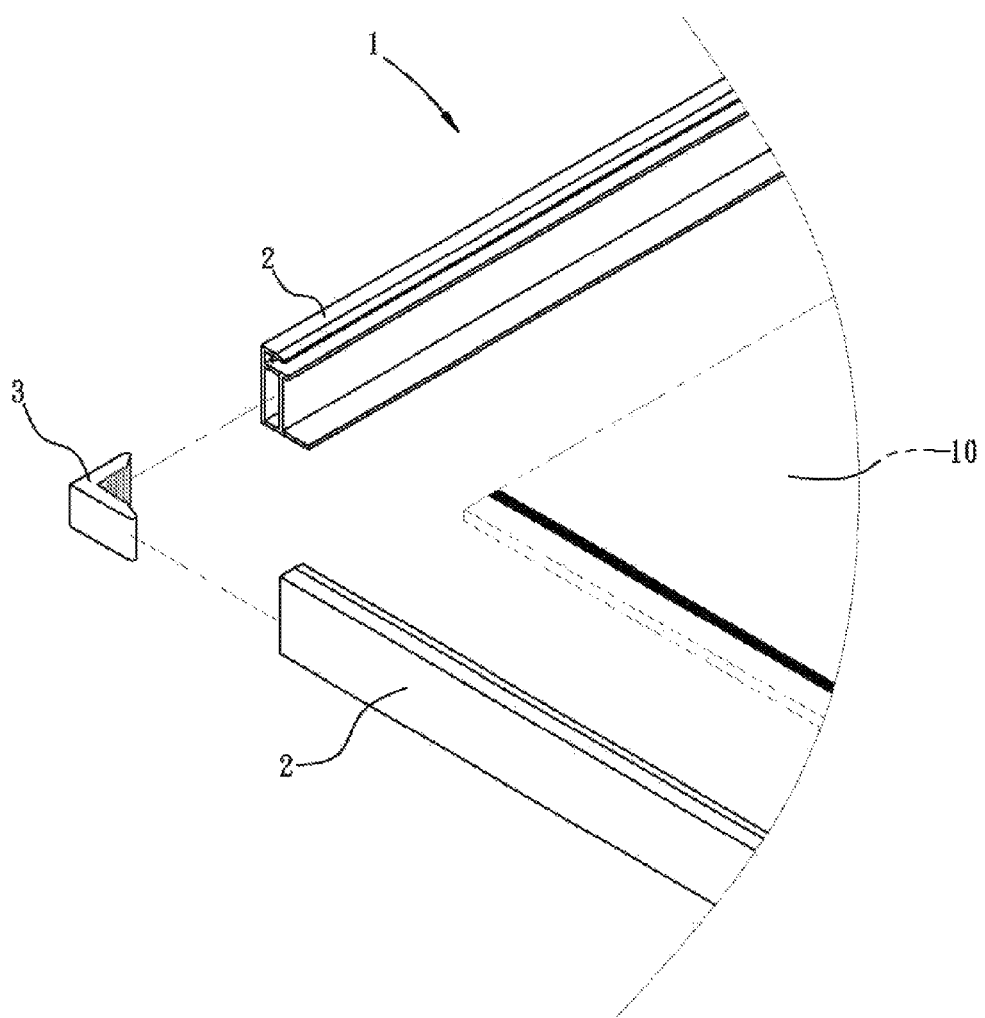
FIG. 2 is an exploded view of frame structure for solar cell module according to the present invention.
Figure 3:
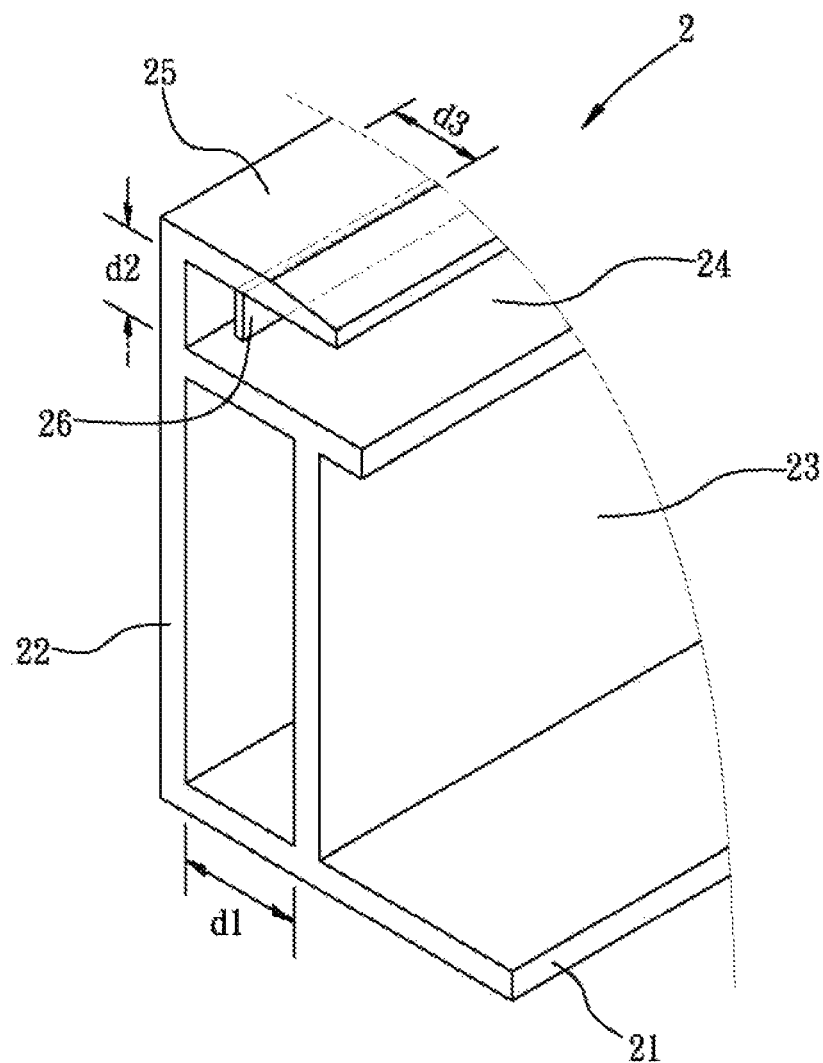
FIG. 3 is a three-dimensional view showing a cross section of a sidebar used in a frame structure for solar cell module according to a first embodiment of the invention.
Figure 4:
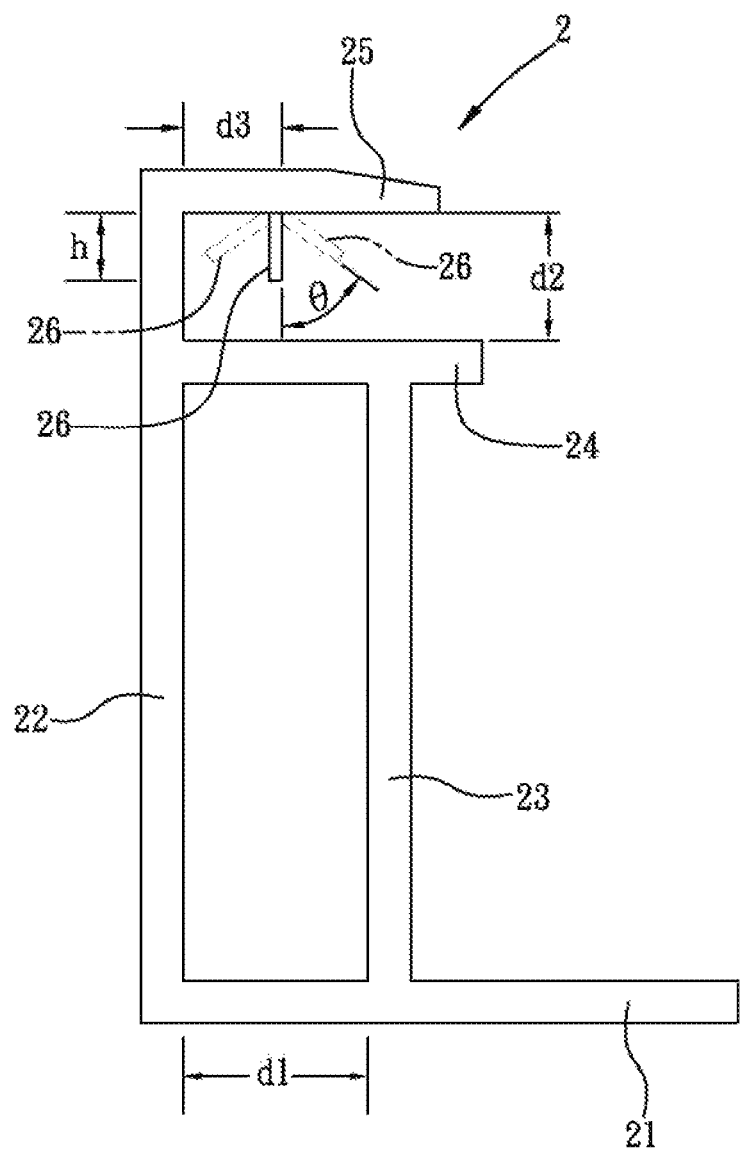
FIG. 4 is a cross sectional view of a thin panel protruding out of the sidebar of the first embodiment that is allowed to sway in two ways by an angle without snapping.
Figure 5:
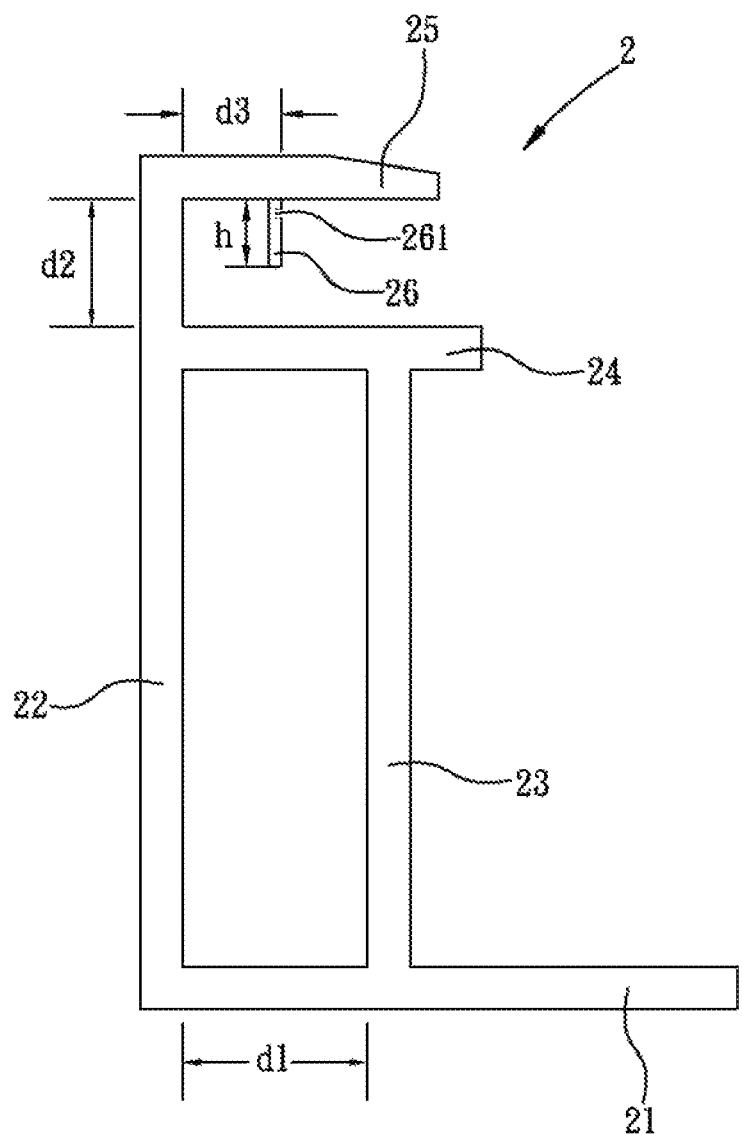
FIG. 5 is a cross sectional view of a thin panel that is formed with a groove on one side thereof and protruding out of the sidebar in a frame structure according to a second embodiment of the invention.
Figure 6:
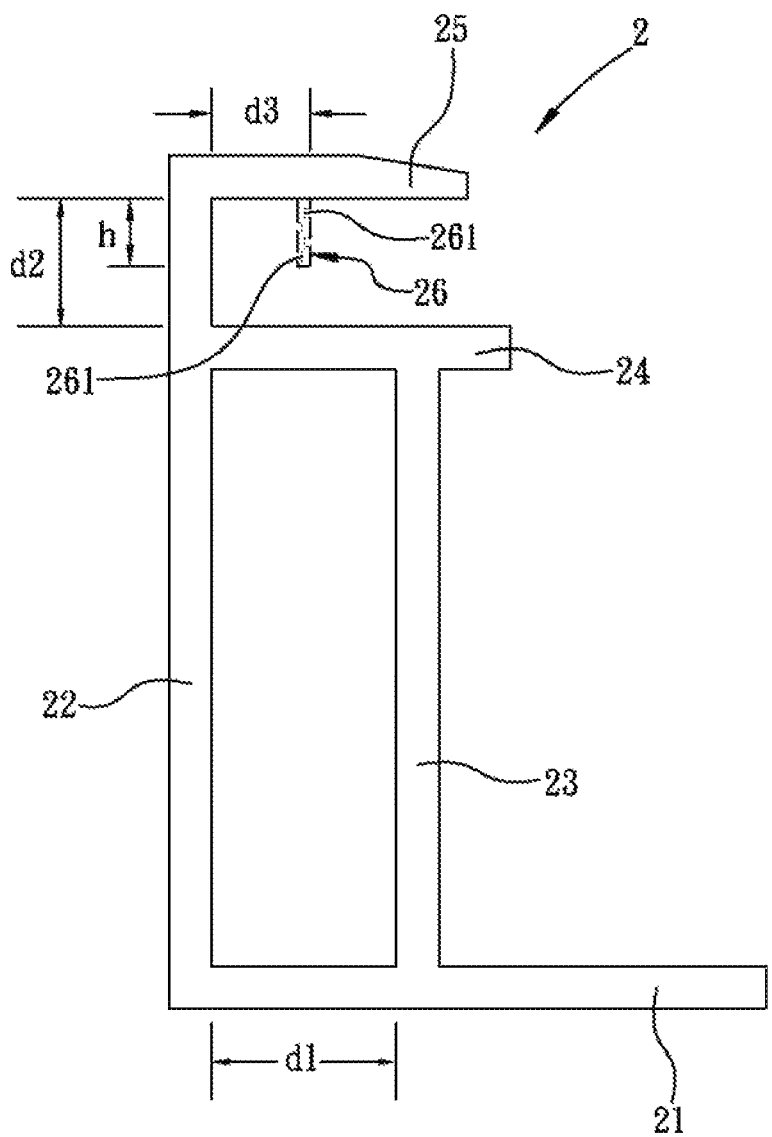
FIG. 6 is a cross sectional view of a thin panel that is formed with at least one groove on both sides thereof and protruding out of the sidebar in a frame structure according to a third embodiment of the invention.
Figure 7:
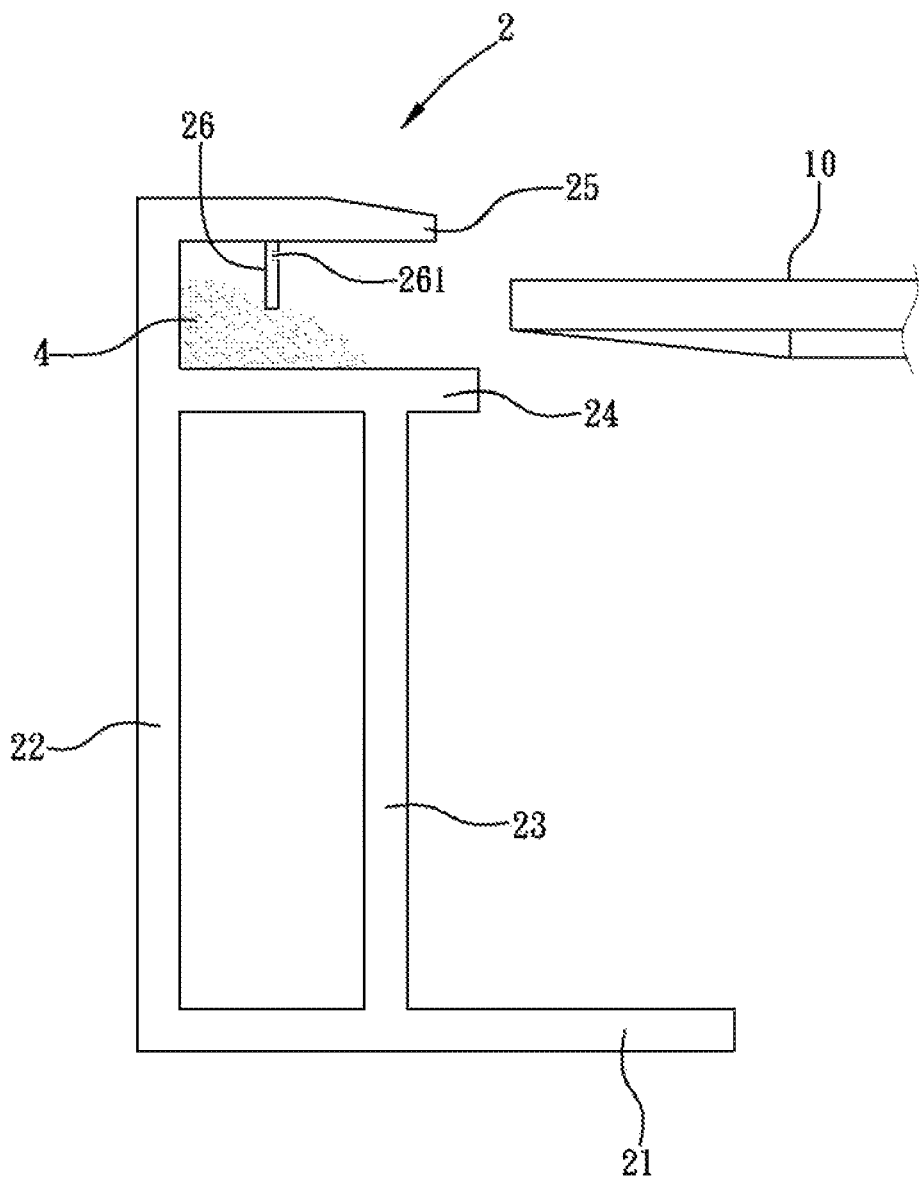
FIG. 7 is schematic diagram showing a frame structure of the present invention before it is integrated with a solar cell element.
Figure 8:
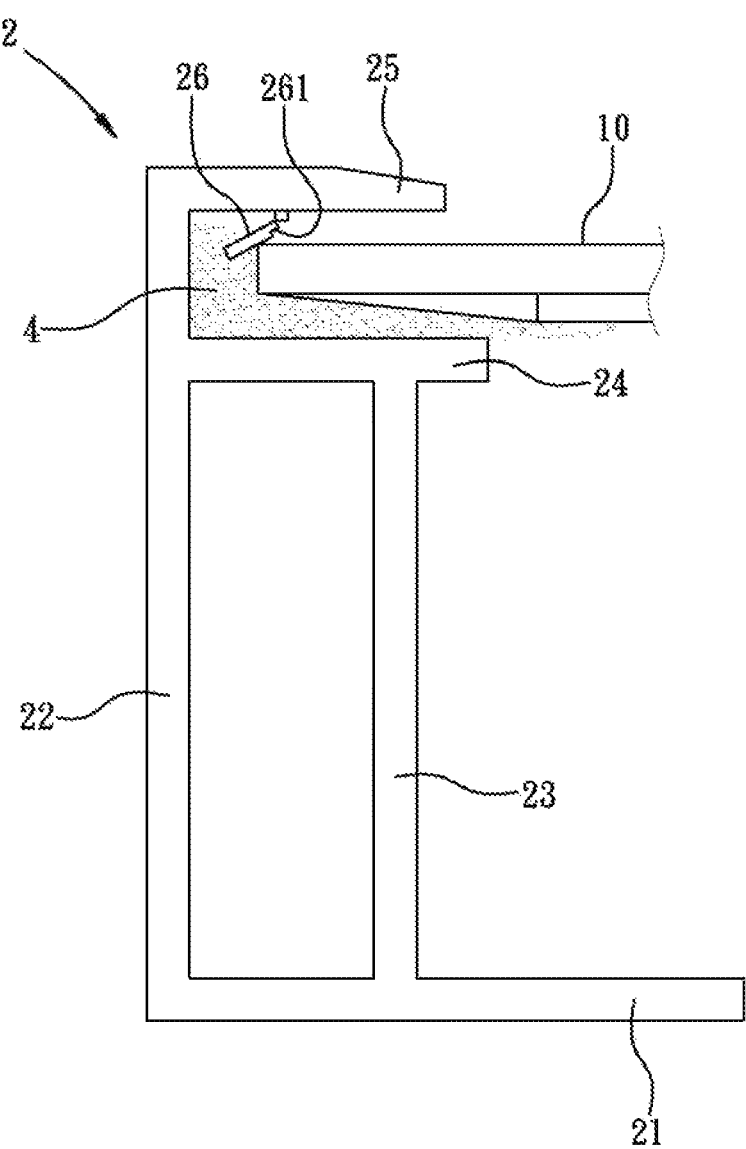
FIG. 8 is schematic diagram showing a frame structure of the present invention after it is integrated with a solar cell element.

Please refer to FIG. 1 to FIG. 8, in which FIG. 1 is a schematic diagram showing a frame structure for solar cell module according to the present invention; FIG. 2 is an exploded view of frame structure for solar cell module according to the present invention; FIG. 3 is a three-dimensional view showing a cross section of a sidebar used in a frame structure for solar cell module according to a first embodiment of the invention; FIG. 4 is a cross sectional view of a thin panel protruding out of the sidebar of the first embodiment that is allowed to sway in two ways by an angle without snapping; FIG. 5 is a cross sectional view of a thin panel that is formed with a groove on one side thereof and protruding out of the sidebar in a frame structure according to a second embodiment of the invention; FIG. 6 is a cross sectional view of a thin panel that is formed with at least one groove on both sides thereof and protruding out of the sidebar in a frame structure according to a third embodiment of the invention; FIG. 7 is schematic diagram showing a frame structure of the present invention before it is integrated with a solar cell element; and FIG. 8 is schematic diagram showing a frame structure of the present invention after it is integrated with a solar cell element.

The frame structure 1 for solar cell module is composed of four sidebars 2 and four corner connectors 3, in which the four sidebars 2 are constructed almost the same but are only different in length for allowing the assembly of the four sidebars 2 to conform to the size of the solar cell element 10. For instance, if the frame structure is designed for framing a rectangle-shaped solar cell element, the top and bottom sidebars should be formed in a length shorter that of the left and right sidebars. Moreover, each of the four corner connecters 3 is disposed between any two neighboring sidebars 2 for connecting the two, as shown in FIG. 1 and FIG. 2.

In an embodiment of the invention, each of the four sidebars 2 is comprised of a bottom 21, a first vertical wall 22, a second vertical wall 23, a first horizontal wall 24 and a second horizontal wall 25 in a manner that the first vertical wall 22 is formed with a width larger that that of the second vertical wall 23, and the first vertical wall 22 is connected to an end of the bottom 21 by an end thereof while being arranged perpendicular to the bottom 21; the second vertical wall 23 is perpendicularly connected to the bottom 21 while allowing the second vertical wall 23 to be spaced from the first vertical wall 22 by a specific first distance d1; the second horizontal wall 25 is connected to an end of the first vertical wall 22 that is disposed away from the bottom 21 while being arranged perpendicular to the first vertical wall 22; the first horizontal wall 24 is perpendicularly connected to the first vertical wall 22 and is spaced from the second horizontal wall 25 by a specific second distance d2 while being arranged abutting against an end of the second vertical wall 23 that is disposed away from the bottom 21; the second horizontal wall 25 is formed with a thin panel 26 at a side thereof that is proximate to the first horizontal wall 24 while allowing the thin panel to extend toward the first horizontal wall 24.

Moreover, the thin panel 26 is formed with a height h smaller than the specific second distance d2; and the thin panel 26 is arranged spacing from the first vertical wall 22 by a specific third distance d3 while enabling the specific third distance d3 to be smaller than the specific first distance d1.

It is noted that while fitting a solar cell element 10 into a gap formed between the first horizontal wall 24 and the second horizontal wall 25, the thin panel 26 will be pushed by the inserting solar cell element 10, causing the thin panel 26 to be bended or even snapped by the leverage effect of the inserting solar cell element 10. However, the thin panel 26 is designed to sway in a direction toward or away from the first vertical wall 22 by an angle θ before it is bended or snapped, whereas the angle θ is smaller than or equal to 60 degrees, and preferably, angle θ should be 45 degrees.

In an embodiment shown in FIG. 5, the thin panel 26 is formed with a groove 261 at a side thereof that is disposed away from the first vertical wall; and in another embodiment shown in FIG. 6, the thin panel 26 is formed in a manner that both sides of the thin panel, that one is arranged neighboring to the first vertical wall 22 while another is arranged away from the same, are each formed with at least one groove 261. By the formation of the grooves 261 on the thin panel 26, the thin panel can be forced to bend or even snap more easily by the inserting of the solar cell element 10.

Before integrating the solar cell element 10 with the sidebars 2, the gap formed between the first and the second horizontal walls 24, 25 will first be filled with a filling material 4 without having the filling material to be restricted in any way. Thereafter, while insetting the solar cell element 10 into the gap formed between the first and the second horizontal walls 24, 25, the inserting of the solar cell element 10 will squeeze the filling material 4 on the thin panel and then force the thin panel 26 to move toward the first vertical wall 22, and consequently, due the blocking of the first vertical wall 22, the filling material 4 will overflow and thus move in a direction away from the first vertical wall 22, whereas the portion of the overflowed filling material 4 that is flowing proximate to the second horizontal wall 25 will be blocked by the thin panel 26 and thus will be restricted from moving out of the range that is defined within the width of the second horizontal wall 25, while allowing the rest of the overflowed filling material 4 that is flowing proximate to the first horizontal wall 24 to move freely until the engaging of the solar cell element 10 with the sidebars 2 is completed, as shown in FIG. 8.

Operationally, as the overflow of the filling material 4 is blocked by the thin panel 26 that is arranged protruding out of the second horizontal wall 25 toward the first horizontal wall 24, the front of the solar cell element 10 can be prevented from being covered by overflowed filling material 4, and thus the overall manufacturing time for the solar cell module can be reduced since there will be no additional machining process required for removing the overflowed filling material 4.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A frame structure for solar cell module, comprising: four sidebars and four corner connectors in a manner that any two neighboring sidebars are connected by one corner connector selected from the four corner connectors, while characterized in that each of the four sidebars is comprised of a bottom, a first vertical wall, a second vertical wall, a first horizontal wall and a second horizontal wall in a manner that the first vertical wall is formed with a width larger that that of the second vertical wall, and the first vertical wall is connected to an end of the bottom by an end thereof while being arranged perpendicular to the bottom; the second vertical wall is connected to the bottom and is arranged perpendicular to the bottom while allowing the second vertical wall to be spaced from the first vertical wall by a specific first distance; the second horizontal wall is connected to an end of the first vertical wall that is disposed away from the bottom while being arranged perpendicular to the first vertical wall; the first horizontal wall is perpendicularly connected to the first vertical wall and is spaced from the second horizontal wall by a specific second distance while being arranged abutting against an end of the second vertical wall that is disposed away from the bottom; the second horizontal wall is formed with a thin panel at a side thereof that is proximate to the first horizontal wall while allowing the thin panel to extend toward the first horizontal wall, and to be formed with a height smaller than the specific second distance; the thin panel is arranged spacing from the first vertical wall by a specific third distance while enabling the specific third distance to be smaller than the specific first distance.

2. The frame structure of claim 1, wherein the thin panel is designed to sway in a direction toward or away from the first vertical wall by an angle before it is bended or snapped.

3. The frame structure of claim 2, wherein the angle is not larger than 60 degrees.

4. The frame structure of claim 1, wherein the thin panel is formed with a groove at a side thereof that is disposed away from the first vertical wall.

5. The frame structure of claim 1, wherein, the thin panel is formed in a manner that both sides of the thin panel, that one is arranged neighboring to the first vertical wall while another is arranged away from the same, are each formed with at least one groove.

* * * * *